United States Patent
Han

(10) Patent No.: US 6,873,599 B1
(45) Date of Patent: Mar. 29, 2005

(54) APPARATUS AND METHOD FOR ERROR ISOLATION IN HYBRID COMMUNICATIONS SYSTEMS

(75) Inventor: Yihwu Han, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/468,164

(22) Filed: Dec. 21, 1999

(51) Int. Cl.$^7$ ............................................... H04L 12/26
(52) U.S. Cl. ..................................... 370/249; 370/353
(58) Field of Search ................................ 370/216, 217, 370/218, 229, 236, 236.02, 241, 214.1, 242, 244, 247, 249, 352, 353, 354, 355, 356, 395.1, 230, 248, 250–252, 395.3–395.32, 453, 236.1, 236.21, 241.1

(56) References Cited

U.S. PATENT DOCUMENTS

| | | | |
|---|---|---|---|
| 646,548 A | * | 4/1900 | Fitzgerald .................... 508/217 |
| 5,367,520 A | * | 11/1994 | Cordell .................. 370/395.71 |
| 5,506,847 A | * | 4/1996 | Shobatake .................. 370/338 |
| 5,659,540 A | * | 8/1997 | Chen et al. .................. 370/249 |
| 5,710,760 A | * | 1/1998 | Moll ........................... 370/249 |
| 5,940,375 A | * | 8/1999 | Soumiya et al. ............. 370/249 |
| 5,974,046 A | * | 10/1999 | Kim et al. ................ 370/241.1 |
| 6,269,082 B1 | * | 7/2001 | Mawhinney et al. ........ 370/247 |
| 6,404,740 B1 | * | 6/2002 | Yoshida ................... 370/241.1 |
| 6,434,118 B1 | * | 8/2002 | Kirschenbaum .......... 370/236.1 |
| 6,442,175 B1 | * | 8/2002 | Shibuya ....................... 370/474 |
| 6,480,888 B1 | * | 11/2002 | Pedersen ..................... 709/218 |

OTHER PUBLICATIONS

Integrated Services Digital Network (ISDN) Maintenance Principles, B–ISDN Operation and Maintenance Principles and Functions, International Telecommunication Union, pp. 1–46, Nov. 1995.

PortMaster 4 Datasheet, Integrated Access Concentrator, Lucent Technologies, <http://www.livingston.com/marketing/products/pm4_datasheet.html>, printed Sep. 2, 1998.

\* cited by examiner

*Primary Examiner*—Dang Ton
*Assistant Examiner*—Phuc Tran

(57) ABSTRACT

A hybrid telecommunications component in accordance with the principles of the present invention affords loopback test capabilities across boundaries between circuit switched and packet switched components. A loopback test which encompasses at least a portion of the packet switched side of a hybrid system may be initiated from the circuit switched side of the hybrid device. Additionally, a loopback test which encompasses at least a portion of the circuit switched side of a hybrid system may be initiated from the packet switched side of the hybrid device. In an illustrative embodiment, when a loopback test of the circuit switched side is initiated by the packet switched side, the loopback test is carried out by the circuit switched side, with the results being reported by the circuit switched side to the packet switched side.

20 Claims, 2 Drawing Sheets

APPARATUS AND METHOD FOR ERROR ISOLATION IN HYBRID COMMUNICATIONS SYSTEMS

FIELD OF THE INVENTION

The invention relates to the isolation of errors in communications systems and, more particularly, to the isolation of errors in hybrid systems which include both packet switching and time division multiplexing elements.

BACKGROUND OF THE INVENTION

In 1876, inside a third floor walk-up garret apartment in the Scollay Square section of Boston Mass., Alexander Graham Bell spoke the first sentence transmitted over telephone wires. Technical innovations have dramatically transformed the telecommunications industry over the past one hundred and twenty three years. For example, telecommunications switching systems have evolved considerably from "hand operated" systems in which one instrument was electrically connected (through a hierarchical switching network) to another through the intervention of a human operator who would physically plug one circuit into another. Such direct electrical connection of two or more channels between two points (at least one channel in each direction), a connection that provides a user with exclusive use of the channels to exchange information, is referred to as circuit switching, or line switching. Human operators have largely been replaced by systems which employ electronic switching systems (ESS, e.g., 5ESS), in which the instruments are automatically connected through the network by electronic systems. Nevertheless, such switching systems often still employ circuit switching, a technique which yields highly reliable service, particularly for such "real time" communications applications as voice, in which the momentary loss of a channel is annoying and repeated such losses are unacceptable. Electronic switching systems, such as the 5ESS may interconnect telephone instruments through circuit switching, employing time division multiplexing (TDM), for example. In order to ensure that end-users receive the appropriate quality of service, the switches typically monitor and periodically test the activity of the trunks and lines that carry the channels being switched. If a communications error occurs, the switch may employ a "loopback" to isolate, or determine the exact location of, the system component that caused the error. Once isolated through a loopback, the system may reconfigure itself so that data may be routed around the failed system component or take other corrective measures.

Additionally, a technique known as packet switching, may be employed is often employed for the transmission of data over telecommunications network. With packet switching data is transmitted in packets, and the communications channel is only occupied for the duration of a packet's transmission and, after the transmission, the channel is available for use by other packets being transferred for other users. The packetized transmission may be transmitted using asynchronous transfer mode (ATM) techniques. Asynchronous transfer mode (ATM) is a connection-oriented transmission technique that employs fixed-size blocks of data, called cells, each of which consists of a five octet long header and an information field that is forty-eight octets long. Like other switching systems, an ATM switch employs loopbacks to isolate failed components and, once isolated, to recover from a component failure.

Since both types of switching are currently employed in communications systems, some systems employ both ATM and TDM in a single, hybrid, switch, such as an "extended" ESS having both TDM and ATM connections. The ATM section of the device may employ a loopback to isolate errors in the system components to which it provides an interface, and the TDM section of the hybrid device may employ a loopback to isolate errors in the system components to which it provides an interface. However, there are no components that provide loopback capability across the ATM and TDM sections. Consequently, errors may occur in an area of hybrid device that is inaccessible to traditional loopback testing and the isolation and repair of system failures may thereby be significantly delayed.

A hybrid switching device, such as an "extended" 5ESS may include both a circuit switching side, in the form of it's switching core, and a packet switching side, in the form of a multi-service module (MSM, also known as Packet Driver). Such a switching device may be connected to other switching devices through cables containing numerous shared telephone circuits, the cables often being referred to as trunks or paths. In order to locate faults within a packet switching section of a hybrid switch, or along a length of a trunk or a path associated with the packet switching section of the switch, a loopback test may be performed to test various portions, of the path between circuit switched components and packet switched components. In this way, the failed section may be located and adjustments may be made to correct the failure.

However, there is no facility currently available for a circuit switched side to initiate a loopback test that includes any portion of the packet switched side of the switch, or, conversely, for a packet switched side of the switched to initiate a loopback test that extends to any portion of the circuit switched side of the switch. Because such facilities are not available, a circuit switched side may route a call to a failed area of the packet switched side. Consequently, the call could be dropped by the packet switching side. Similarly, a call originating on the packet switching side may be dropped by a failed component on the circuit switching side of the switch and, without a means for locating errors on the circuit switching side, the packet switching side may continue, obliviously, to send calls to a failed segment of the circuit side of the switch.

An apparatus and method that provides for loopback testing across circuit switched (e.g., TDM) and packet switched (e.g., ATM) boundaries would therefore be highly advantageous.

SUMMARY

A hybrid telecommunications component in accordance with the principles of the present invention affords loopback test capabilities across circuit/packet switched boundaries. In accordance with the principles of the invention a loopback test which encompasses at least a portion of the packet switched side of a hybrid system may be initiated from the circuit switched side of the hybrid device. Additionally, a loopback test which encompasses at least a portion of the circuit switched side of a hybrid system may be initiated from the packet switched side of the hybrid device. In an illustrative embodiment, when a loopback test of the circuit switched side is initiated by the packet switched side, the loopback test is carried out by the circuit switched side, with the results being reported by the circuit switched side to the packet switched side.

The cross-boundary loopback test capability is particularly useful in a device such as an extended 5ESS (or known as 7E), for example, which includes both packet switching facilities, in the form of a multi-service module (MSM or Packet Driver), and circuit switching facilities, in the form of the core switch. In such an application, the packet switched, circuit switched boundary would take the form of an asynchronous transfer mode (ATM)/time division multiplexed (TDM) boundary. That is, the loopback testing would cross ATM/TDM boundaries, thereby providing for the isolation and repair of system failures in such a hybrid telecommunications component.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

A hybrid telecommunications component in accordance with the principles of the present invention affords loopback test capabilities across circuit/packet switched boundaries. In accordance with the principles of the invention a loopback test which encompasses at least a portion of the packet switched side of a hybrid system may be initiated from the circuit switched side of the hybrid device. Additionally, a loopback test which encompasses at least a portion of the circuit switched side of a hybrid system may be initiated from the packet switched side of the hybrid device. In an illustrative embodiment, when a loopback test of the circuit switched side is initiated by the packet switched side, the loopback test is carried out by the circuit switched side, with the results being reported by the circuit switched side to the packet switched side.

The cross-boundary loopback test capability is particularly useful in a device such as an extended 5ESS, for example, which includes both packet switching facilities, in the form of a multi-service module (MSM), and circuit switching facilities, in the form of the core switch. In such an application, the packet switched, circuit switched boundary would take the form of an asynchronous transfer mode (ATM)/time division multiplexed (TDM) boundary. That is, the loopback testing would cross ATM/TDM boundaries, thereby providing for the isolation and repair of system failures in such a hybrid telecommunications component.

Figure 1:
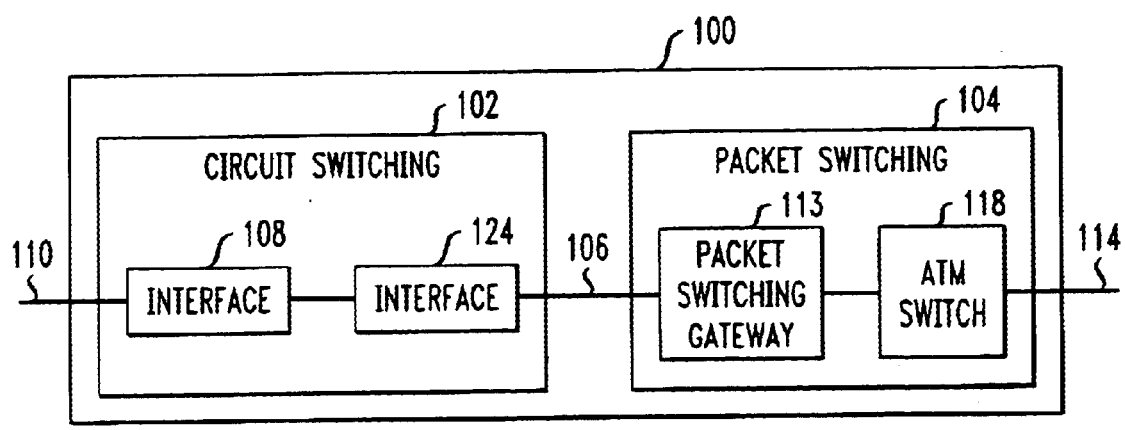
FIG. 1 is a conceptual block diagram of a hybrid telecommunications system in accordance with the principles of the present invention.

In accordance with the principles of the present invention, a packet-switched/circuit-switched hybrid device such as illustrated in the conceptual block diagram of FIG. 1 includes a circuit switching section 102 and a packet switching section 104. The circuit switching section 102 communicates with the packet switching section 104 through a link 106 that may carry T1, E1, or STS1 data formats, or an internal format based on the above for example. The circuit switching section 102 communicates through an interface 108 with one or more other switches (not shown) via one or more trunks 110. The packet switching section 104 communicates through a packet switching-gateway 113 with one or more other switches via one or more trunks 114. The packet switching gateway is a device that converts circuit switching information to packet switching and vice versa. The gateway's circuit switching side may be a loopback point to the circuit switching path and its packet switching side may be a loopback point to the packet switching path. In accordance with the principles of the invention, the circuit switched section 102 may initiate loopback tests which encompass one or more segments of the communications path provided by the packet switched side of the hybrid, including the link 106, the packet switching section 104, the trunk(s) 114, and the packet switching section's gateway 113.

ATM Loopback tests are known, and discussed, for example, in International Telecommunications Union (ITU) recommendation I.610 (11/95) pages 16 through 22 which are hereby incorporated by reference in their entirety. On the circuit switched side, there are several test calls to test connections between two circuit switched central offices. Such loopback tests may employ a test call such as test call 108, for example, to establish the loopback. Test call 108 is known and employed by conventional Central Office Switches if the switches on both ends of a circuit being tested are circuit switched.

In accordance with the principles of the present invention, the basic approach to testing a hybrid switch is to set up a call from the circuit switching components to the packet switching components and loopback the path at a packet switching component, using the ITU I.610 recommendations. Then, the circuit switching side of such a hybrid device may establish a loopback test, via a looparound trunk/path with a loopback point at the gateway 113, for example. The looparound trunk, a trunk that originates and terminates in the same central switch office, may be established through provisioning. That is, by provisioning the trunk to have an egress port within the central office and an ingress port within the same central office, the trunk is looped back into the same central office. Such provisioning typically requires a craft person to establish the physical connection.

Figure 2:
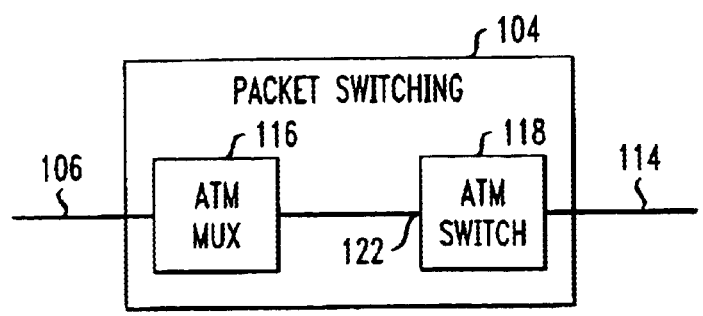
FIG. 2 is a conceptual block diagram of a packet switching portion of a hybrid telecommunications system in accordance with the principles of the present invention.
Figure 3:
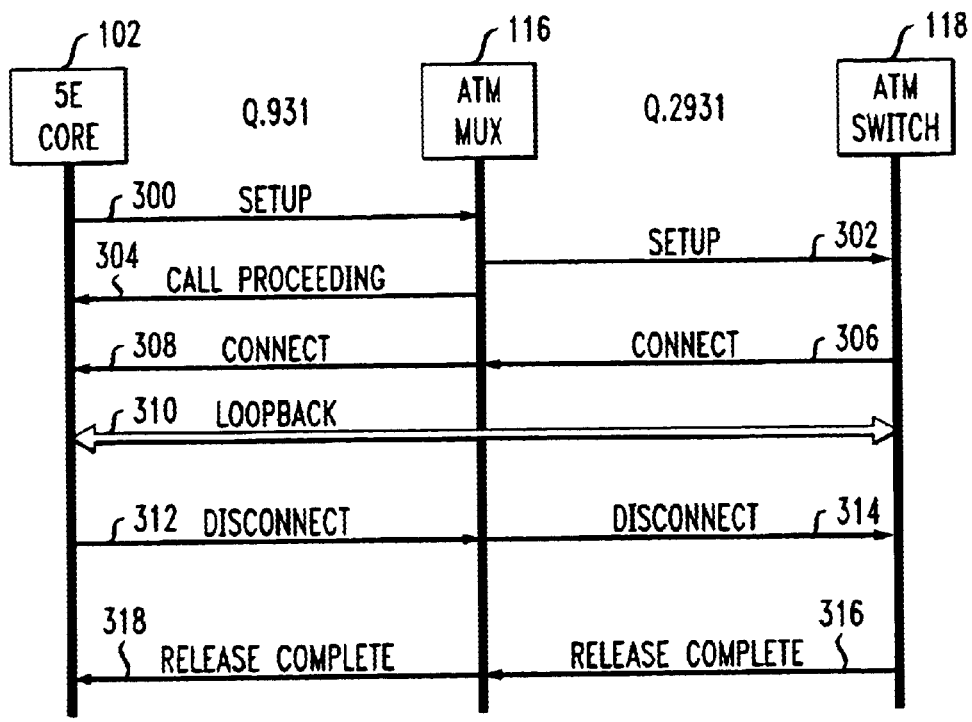
FIG. 3 is a flow diagram which depicts the establishment of a loopback test across circuit and packet switched boundaries in accordance with the principles of the present invention and FIG. 4 is a conceptual block diagram that depicts the operation of a loopback test across circuit and packet switching boundaries in accordance with the principles of the present invention.
Figure 4:
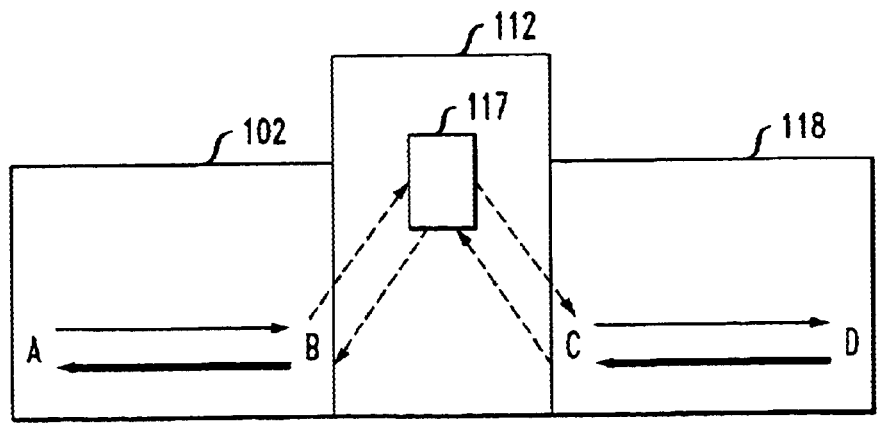

The packet switching gateway 113 (also referred to as interwork unit) may take the form of an ATM MUX device, described in the description related to FIGS. 2 and 3 for the Voice over ATM (VTOA) application, or an Internet Protocol router (IP router), as described in the description related to FIG. 4 for the data application. The IP router may also be referred to as a modem pool device or a remote access controller.

When the packet switching device 113 is an ATM MUX device the loop around path may be established through provisioning (typically requiring the intervention of a craft person to set up the loop around connection) or through signaling. The looparound path may include one or more intermediate points that relay data received from the loopback originating point to the next point on the looparound path. The originating point typically transmits a string of data that, ultimately, reaches the looparound terminating point. The looparound terminating point responds to the reception of the test data may echo the received data or otherwise respond in a manner expected by the originating point, by complementing the data, for example, before transmitting it back to the originating point. The gateway 113 is capable of looping back the data originating at the circuit switching interface 108, which is a TDM port.

When the originating and terminating points of a proposed loopback path feature IP routing capability, a loopback may be effected using the "IP Ping" capability. An "IP Ping" message is a form of Internet control protocol message (ICMP) that sends an ICMP type 8 datagram to a node and expects an ICMP type 0 return. For example, if the circuit switching interface device 108 features IP capability and the packet switching gateway 104 is an IP routing device, a loopback between the circuit switching side and the packet switching side may be established by the circuit switching interface 108 through use of an IP Ping message that includes the IP address of the packet switching gateway 113. The circuit switching device 108 may be an element of an extended 5ESS core, for example. When the switching gateway 0.113 receives the Ping message from the switching interface 108, the switching gateway 113 returns the IP Ping response to the switching interface 108. Even if the ATM switch's ingress port 122 or egress port 114 does not include IP routing capability, a modified IP Ping protocol employed by the packet switching gateway 113 enables the use of an IP Ping to establish a loopback between the circuit switching interface 108 and the ATM switch ingress port 122, or between the circuit switching interface 108 and the ATM switch egress port 114.

In the illustrative block diagram of FIG. 2, the packet switching gateway 113 within the packet switching device 104 is illustratively embodied as an ATM multiplexer 116. The ATM multiplexer communicates with the ATM switching core 118 through ingress port 122, and the ATM switch communicates with an ATM communications circuit through the egress port 114. The ATM multiplexer would typically communicate with the circuit switching device 102 via the link 106.

A loopback test may employ loopback on demand in such a system, as discussed in relation to the sequence diagram of FIG. 3. In this figure, we use the Q.931 messages to describe the way to set up a path dynamically between device 102 and device 116. Alternatively, it may be advantageous to use the Internet Protocol Device Control (IPDC), rather than Q.931, to set up the connection. The IPDC can carry a message for device 102 to ask device 116 to set up a loopback point at device 118. This message can not be carried by the traditional Q.931 messages. However, since the IPDC implementation may vary depending on the individual implementor, a Q.931 message implementation is used to illustrate the concept. The loopback test, which crosses the circuit switching/packet switching boundary in accordance with the principles of the present invention, is illustratively initiated on the circuit switching side of a hybrid device, in circuit switching device 102, for example. The processing steps which take place between the circuit switching side and the ATM multiplexer may be carried out according to processes described in detail in CCITT Q.931 and the steps which take place between the ATM multiplexer and the ATM switch are carried out according to processes described in detail in CCITT Q.2931, which documents are hereby incorporated by reference in their entity.

In step 300 the circuit switching device 102, which may be a 5ESS core, for example, sets up a loop around trunk by sending a request to the ATM multiplexer 116 for a connection to the ATM switch 118. This loopback request message may be carried out using an IPDC message, but we use available Q.931 messages to illustrate the concept. However, the intent for the loopback and the designation of the loopback point are implemented using an IPDC message, or messages, not directly by Q.931. In step 302 the ATM multiplexer passes this request along to the ATM switch 118.

In step 304 the ATM multiplexer returns a call proceeding message to the switching device 102. From step 304 the process proceeds to step 306 where the ATM switch establishes a channel, that is, allocates bandwidth, etc., between itself and the ATM multiplexer 116. In step 308 a similar channel is established between the ATM multiplexer and the switching device 102. After establishing the loopback connection, in step 310 a loopback test is performed. The step 310 consists of two substeps: (1) establish an ATM connection path, (2) use ITU I.610 standard to set up an ATM OAM lookback. In the second substep, the the ATM switch is designated as the loopback point. In the course of the loopback test, the circuit switching device 102 sending a test message and the ATM switch, which in this example receives the message at its ingress port 122 and sends a return message from its egress port 114, returns a loopback message to the circuit switching device 102. If the connection fails the test, a fault lies somewhere between the circuit switching device 102 and the ATM switch 118, inclusively. Accordingly, the circuit switching device, 102 will be aware of the failed path and will not send calls to that path. Additionally, the circuit switching device 102 may provide alarms that will initiate corrective measures.

After completion of the loopback test the circuit switching device 102 requests a disconnect in step 312. The ATM multiplexer 116 passes this disconnect request along to the ATM switch 118 in step 314. In step 316 the ATM switch releases the channel between itself and the ATM multiplexer 116 and, in step 318 the ATM multiplexer 116 releases the channel between itself and the circuit switching device 102.

In accordance with the principles of the present invention, the packet switching gateway 113 may be embodied as an IP router 112, as illustrated in the conceptual block diagram of FIG. 4, wherein the packet switching device 104 includes an IP router 112 that communicates with the ATM switch 118 through the ingress port 122. In this example, the interwork unit, i.e. the packet switching gateway, is a modern pool device. The IP router 112 may take the form of a modem pool device, for example. In this illustrative embodiment, the circuit switching device 102, which may be a 5ESS core, for example, offers IP communications capability for communications with the packet switching gateway 113, which, in this embodiment, is a modem pool device. It is also assumed that the ATM switch 118 does not include IP routing capability, and that a path between the ATM switch and the switching gateway 113 (modem pool device) is established. The physical path between the modem pool device, and the ATM switch, 118, can be done either through provisioning or through ATM signaling. Given these assumptions, the circuit switching device 102 may use a route index to identify which of its ports to employ in the loopback test. After determining which port to employ for the test, the circuit switching device 102 sends an IP packet to the switching gateway 113. The IP packet includes a special address that identifies the AIM egress port 114 to which the packet is to be addressed. That is, the source address within the IP datagram is used as the destination address, thereby creating a loopback. An incoming facility, x, is also employed to identify to the switching gateway 113 the address and channel number, y, of the ATM switch's egress port 113.

Upon receipt of the IP datagram identified as a loopback datagram, the IP router 112 swaps the source and destination IP addresses of the received datagram, thereby looping the datagram back to the source. If the datagram sent to the IP router 112 was an ICMP type 8 message, the router will return an ICMP type 0 response in order to satisfy the "Ping"

requirements. Additionally, the EP router 112 will set up an entry in its routing table 117, an internal entry not included in neighborhood hello messages, that includes a facility address and channel number for a loopback. This routing message will eventually time out and be removed from the routing table 117. The received IP datagram may be converted to ATM cells or encapsulated as a frame relay packet set to the virtual path identifier/virtual channel identifier (VP/VCI) or data link connection identifier (DLCI) that is connected to an ATM egress port which loops back everything it receives. Since the IP router 112 swaps source and destination addresses in the IP datagram, the datagram is routed to the new routing entry (the source address) and the IP ping response (ICMP type 0) is returned to complete the loopback test.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims, appended hereto.

What is claimed is:

1. A method of testing telecommunications systems which include both circuit switching and packet switching components comprising the steps of:
   (A) a circuit switching component initiating a loopback test that encompasses communications path through a packet switching component;
   (B) the packet switching component returning a looped back test message to the circuit switching component; and
   (C) the circuit switching component responding to the reception of the returned test message by determining that the path encompassed by the packet switching component is operational;
   wherein the circuit switching component employs time division multiplexing (TDM) and the packet switching component employs asynchronous transfer mode (ATM) packet switching.

2. The method of claim 1 further comprising the step of:
   (D) the circuit switching component responding to absence of a returned test message from the packet switching component by determining that the path encompassed by the packet switching component is not operational, or provisioning data is not consistent with the communications path.

3. A method of testing telecommunications systems that include both circuit switching and packet switching components, and an interwork unit between the circuit switching and packet switching components, the interwork unit providing an Internet Protocol Device Control (IPDC) and an asynchronous transfer mode Switched Virtual Circuit Capability, comprising the steps of:
   (A) a circuit switching device requesting an Asynchronous Transer Mode (ATM) address in an ATM switch to establish a loopback path;
   (B) an interwork unit establishing an ATM Switched Virtual Circuit with the ATM address via an ATM virtual connection through the ATM switch using the ATM address;
   (C) establishing the ATM address in the ATM switch as a loopback point; and
   (D) performing a loopback test from the circuit switching device through the loopback point established in step (C).

4. A method of testing telecommunications systems that include both circuit switching and packet switching components, and at least one interwork unit connecting packet switching and circuit switching components, the interwork unit being an Internet Protocol (IP) device, the method comprising the steps of:
   (A) a circuit switching device sending a packet to an interwork unit, the packet identifying a specific packet switching point at which a loopback is to be effected,
   (B) the interwork unit routing the packet to a pre-established loopback path through the packet switching component; and
   (C) the interwork unit returning the circuit switched data to the circuit switching device.

5. The method of claim 4 wherein step (A) comprises:
   (A1) the circuit switching device sending an Internet protocol packet in which an egress port for a looparound is included, the looparound point being determined by an incoming facility address and a channel number included within the packet.

6. The method of claim 5 further comprising the step of:
   (D) the interwork unit setting an entry in a routing table with the incoming facility address and channel number as a looparound address.

7. The method of claim 6 wherein the interwork unit's routing table entry is an internal entry.

8. The method of claim 7 wherein the interwork unit removes the routing table entry after at timeout.

9. The method of claim 8 wherein the interwork unit swaps source and destination addresses in the Internet protocol packet it receives from the circuit switching device in step (A1).

10. The method of claim 9 wherein the interwork unit enters an echo response in a packet it returns to the circuit switching side if the looparound the circuit switching component operates.

11. The method of claim 5 wherein the interwork unit swaps source and destination addresses in the Internet protocol packet it receives from the circuit switching device in step (A1).

12. The method of claim 11 wherein the interwork unit enters an echo response in a packet it returns to the circuit switching side if the looparound the circuit switching component operates.

13. The method of claim 5 wherein the interwork unit swaps source and destination address in the Internet protocol packet it receives from the circuit switching device in step (A1).

14. The method of claim 4 wherein the circuit switching device employs time division multiplexing (TDM) and the packet switching component employs asynchronous transfer mode (ATM) packet switching.

15. The method of claim 4 wherein the interwork unit enters an echo response in a packet it returns to the circuit switching side if the looparound the circuit switching component operates.

16. A telecommunications system comprising:
   a circuit switching component for initiating a loopback test that encompasses a communications path through a packet switching component; and
   a packet switching component responsive to the reception of a test message from the circuit switching component by returning the test message to the circuit switching component, the circuit switching component responsive to the reception of the returned test message by determining that the path encompassed by the packet switching component is operational;

wherein the circuit switching component employs time division multiplexing (TDM) and the packet switching component employs asynchronous transfer mode (ATM) packet switching.

17. A telecommunications system comprising:

a circuit switching component;

a packet switching component; and an interwork unit connecting the packet switching and circuit switching components, the interwork unit being an Internet Protocol (IP) device, the circuit switching component being configured to send a packet to the interwork unit, the packet identifying a specific packet switching point at which a loopback is to be effected, the interwork unit being responsive to the reception of such a packet from the circuit switching component by routing the packet to a pre-established loopback path through the packet switching component the racket switching component being responsive to reception of such a packet from the interwork unit by routing the packet via the pre-established loopback path to the interwork unit;

wherein the interwork unit is responsive to the reception of the packet from the packet switching component by returning the packet to the circuit switching component.

18. A method of testing telecommunications systems that include both circuit switching and packet switching components, and an interwork unit between the circuit switching and packet switching components, the interwork unit providing an Internet Protocol Device Control (IPDC) and an asynchronous transfer mode Switched Virtual Circuit Capability, comprising the steps of:

(A) a circuit switching device using IPDC to communicate with the interwork unit to set up a loopback path to a designated ATM loopback point identified by an E.164 ATM address;

(B) performing a loopback test employing the loopback path established in step (A).

19. A method of testing telecommunications systems that include both circuit switching and packet switching components, and at least one interwork unit connecting packet switching and circuit switching components, the interwork unit being an Internet Protocol (IP) device, the method comprising the steps of:

(A) a circuit switching device sending a packet to an interwork unit, the packet identifying a specific packet switching point at which a loopback is to be effected, (B) the interwork unit routing the packet to a pre-established loopback path through the packet switching component, (C) the interwork unit returning the circuit switched data to the circuit switching device, and (D) the circuit switching device sending an Internet protocol packet in which an egress port for a looparound is included, the looparound point being determined by an incoming facility address and a channel number included within the packet;

wherein the interwork unit swap source and destination addresses in the Internet protocol packet it receives from the circuit switching device in step (D).

20. The method of claim 19 wherein the interwork unit enters an echo response in a packet it returns to the circuit switching side if the looparound the circuit switching component operates.

* * * * *